June 14, 1949.  G. G. LANDIS ET AL  2,472,851
APPARATUS FOR ELECTROMAGNETICALLY
CONTROLLING WELDING ARCS Filed Sept. 23, 1944  2 Sheets-Sheet 1

INVENTORS
GEORGE G. LANDIS and
NORMAN J. HOENIE
BY
*Oberlin, Limbach & Day.*
ATTORNEYS June 14, 1949.  G. G. LANDIS ET AL  2,472,851
APPARATUS FOR ELECTROMAGNETICALLY
CONTROLLING WELDING ARCS
Filed Sept. 23, 1944  2 Sheets-Sheet 2

INVENTORS
GEORGE G. LANDIS and
NORMAN J. HOENIE
BY
Oberlin, Limbach & Day.
ATTORNEYS Patented June 14, 1949

2,472,851

UNITED STATES PATENT OFFICE 2,472,851

APPARATUS FOR ELECTROMAGNETICALLY CONTROLLING WELDING ARCS

George G. Landis, South Euclid, and Norman J. Hoenie, Cleveland Heights, Ohio, assignors to The Lincoln Electric Company, Cleveland, Ohio, a corporation of Ohio Application September 23, 1944, Serial No. 555,508

4 Claims. (Cl. 315—347)

The present improvement, relating as indicated to the welding and heat treatment of metal by means of an electric arc, has more particular regard to apparatus wherein the arc is caused to travel in a closed path under the influence of a magnetic field.

While, quite early in the development of the electric arc as a means for heating welding and working metal, it was recognized that an arc could be caused to rotate around the end of a carbon electrode under the influence of a magnet or solenoid, so as to act upon a larger area than if it were directed from a single point (see, for example, Patents Nos. 501,825 and 510,777 to Charles L. Coffin), so far as we are aware no practical or commercial use of this method of arc operation has occurred, although a magnetic field has been employed to direct or "blow" the arc as a means for holding it to a fixed line of operation and to direct it either forwardly, rearwardly or sidewise, as found desirable, along such line.

We have now discovered means whereby the action of the arcing current flowing through a magnetic field engendered by such current may be used to cause an arc to travel continuously in a circular or equivalent closed path, so as advantageously to perform various welding operations as well as of heat treat or otherwise work metals electrically.

One object of our invention is to provide apparatus of the type in question which will be adapted to weld together the ends of pipe sections or like cylindrical metal objects, and particularly the ends of pipe sections when laid in situ to form a pipe line, many miles of which are laid annually for the transport of gas and petroleum products. A further object is to provide an apparatus which will be extremely simple and thus capable of use in the field as well as in the shop, whether for welding or heat treating purposes.

Our improved apparatus is furthermore adapted to operate on flat as well as cylindrical objects, and to heat treat, or otherwise work, metal articles, as well as weld the same.

To the accomplishment of the foregoing and related ends, said invention, then, consists of the means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

Figure 1:
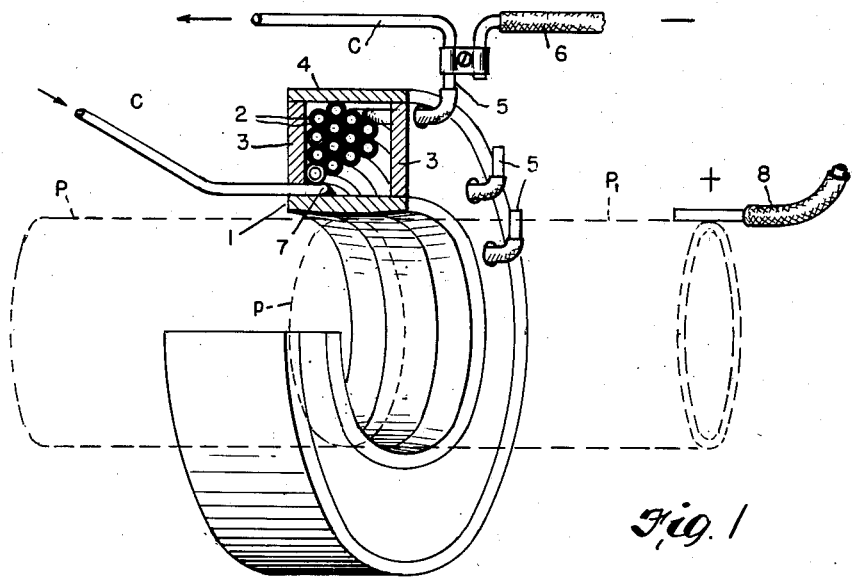
Fig. 1 is a broken perspective view illustrating one form of our improved apparatus which has been particularly designed for welding together the ends of pipe sections.
Figure 3:
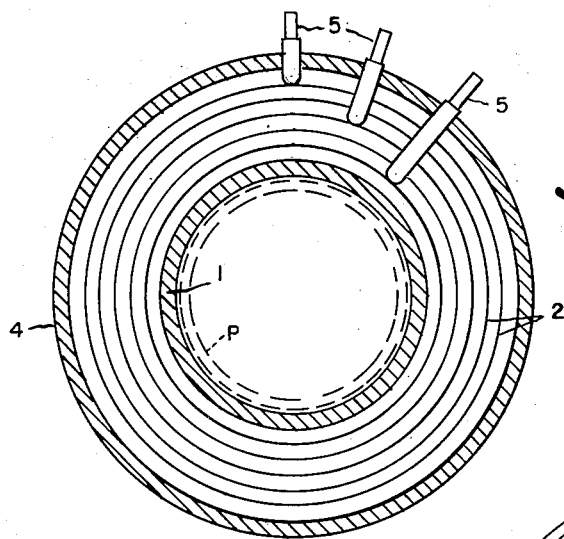
Fig. 3 is a transverse sectional view on a median plane of the apparatus illustrated in Fig. 1.

Referring to the illustrative form of apparatus shown in Figs. 1 and 3, such apparatus, as indicated, is particularly designed for the welding together of the juxtaposed ends of two pipe sections P and P'. The essential element of the apparatus comprises an annular or ring-like electrode 1 which may be made of carbon or graphite, but will preferably be made of hardened steel, since it has been found in actual practice that where thus made of metal such electrode does not deteriorate unduly in use. If it should be eaten away on the surface where the arc takes off, such action is fairly slow and the ring can be readily built up by welding and restored again to proper working condition. As shown in section in Fig. 1 (see also Fig. 5), the face of the electrode member from which the arc is struck will desirably be bevelled inwardly from each side so as correspondingly to narrow the arcing area.

Surrounding such annular electrode 1 is a conductor C that is formed into a plurality of turns 2 substantially concentric with the electrode. Such conductor turns, which form in effect an electro-magnet, will vary in number depending upon the strength of the magnetic field which it is desired to generate. Said coils will be desirably housed between walls 3, 3 and a surrounding shell 4, all of steel, so as to form a path for the magnetic flux produced by the flow of current through the conductor. In order to permit variation in the strength of the field a plurality of spaced connections 5 therewith is provided so that by connecting or plugging in the lead 6 (negative as shown) from the source of supply, either the entire number of turns 2 or selected smaller number may be included in the welding circuit, it being noted that such turns of the conductor are insulated throughout except at the end 7 of the innermost turn which is bare and securely brazed or otherwise electrically connected with the electrode 1. The positive lead 8 will of course be connected with the work as shown.

Where desired, the connector C will be hollow, i. e. in the form of a tube, so that it may be connected in series with a pump or like means for circulating a cooling fluid therethrough, as indicated by the arrows on Fig. 1.

In using the above-described apparatus to weld together the juxtaposed ends of pipe sections P, P', the apparatus is moved over one or the other of such sections until electrode member 7 is located centrally over the circular seam-like p. It will be understood that the internal diameter of the electrode will be such that when properly located over the seam-line such surface will be spaced the proper arcing distance all around from the pipe ends. Thereupon welding current from any suitable source is conducted through the apparatus, such current passing through such number of turns 3 of conductor C as may be included in the circuit depending upon the particular connection 5 used.

As a result of the magnetic field produced by the flow of current through such turns 2, the arc produced where the current is caused to travel around the circular seam-line at a high rate of speed. In other words, while the field produced by the flow of current through the coil, such current being D. C., will be stationary, the arc is caused to move in a circular, or equivalent closed path, due to the passage of the current through such field, the arc being radial, while the lines of flux are axial. While the rate of arc travel may be varied in the manner indicated, and by other means such as the introduction of stabilizers into the arcing area, we have not been able to determine the exact rate of speed under any given conditions except roughly by a change in sound. The movement of the rotating arc is so rapid as to appear almost continuous, and the resultant heating effect is likewise very rapid. Thus we have found that the ends of pipe sections 6 inches in diameter and having a wall thickness of approximately $\tfrac{5}{16}$ inch may be welded together in less than one minute, using a D. C. current of 1000 amperes at 50 volts.

It will be understood that as soon as the pipe ends are brought to the proper welding temperature they will be pressed endwise together by any suitable means, such as are currently used for the purpose. Such means form no part of the present invention; so are not illustrated.

Figure 2:
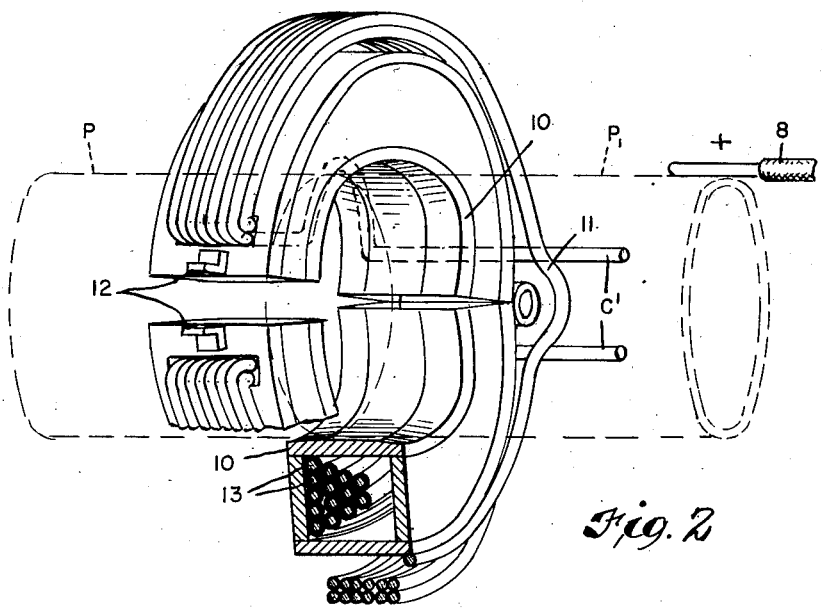
Fig. 2 is a similar broken perspective view of a modified form of such apparatus, such form comprising separable parts in order to facilitate placement and removal of the apparatus on the work.

The modified form of apparatus illustrated in Fig. 2 is in general of the same construction as that just described except that the electrode 10 and associated parts are in effect cut transversely on a diametral line. The resulting parts are then connected together by a hinge 11 at one side and provided with lugs 12 at the opposite side which may be clamped or otherwise held together when the apparatus is positioned for operation, e. g. for welding together the juxtaposed ends of pipe sections P and P', as previously described.

In order to permit the apparatus thus to be formed of separable sections, the several turns 13 of conductor C', here shown as solid, which surround the electrode 10 do not completely encircle the same but are brought back outside the respective sections of the housing by which such turns are encased, from points adjacent the line of separation between such sections. The two half-windings there constituted are then connected together so that the current in the enclosed turns of such winding will flow in the same direction.

With the construction last described, after a seam has been welded between the ends of two pipes in situ, the apparatus may be removed by swinging the hinged sections thereof outwardly, i. e. away from the pipe, and the apparatus placed in position for welding the next joint.

Figure 4:
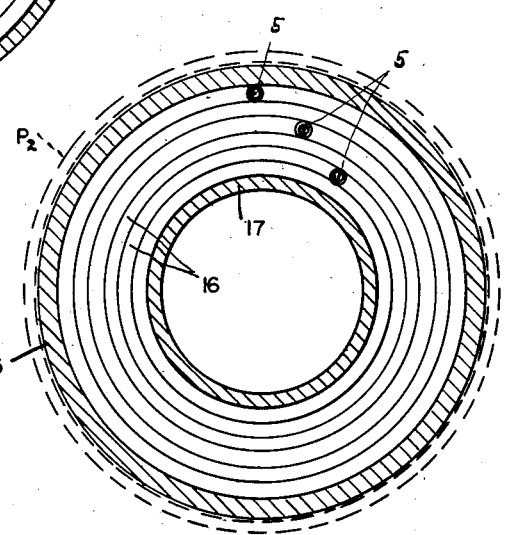
Fig. 4 is a similar sectional view of a modified form of apparatus adapted to be applied to the interior instead of the exterior of pipe sections or similar tubular articles which are to be welded together.

Instead of employing an annular electrode as in the two forms of apparatus previously described, which is adapted to surround pipe sections or equivalent work-pieces, the reverse arrangement illustrated in transverse section in Fig. 4 may be utilized, in which electrode 15 is formed to face outwardly and is of the proper diameter to fit within the pipe section $P^2$ with the proper intervening arcing space. The several turns 16 of the conductor which supplies the welding current to the electrode are then disposed inside of said electrode instead of outside thereof, being contained as before in a suitable shell or housing 17. It has not been considered necessary to show the connections for supplying current to the conductor and the pipe section or equivalent work-piece since these will be substantially the same as in the case of Fig. 1.

Figure 5:
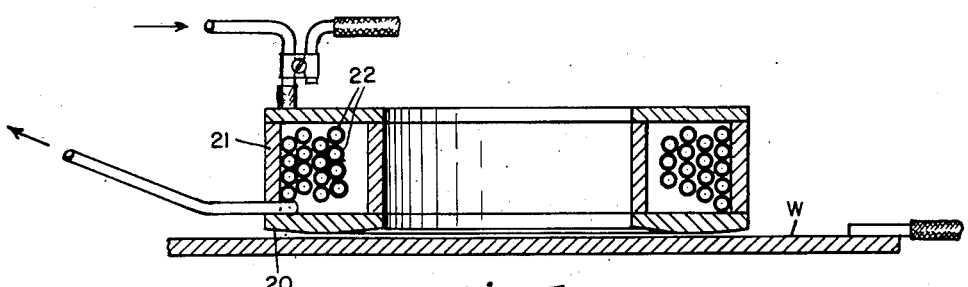
Fig. 5 is an axial section of still another modified form of our apparatus designed for use in applying the arc to a flat instead of a cylindrical surface.

In the further modification illustrated in transverse section in Fig. 5, the annular electrode 20 instead of consisting of the inner (or outer) circular wall, consists of one of the flat side walls of the enclosure 21 in which the turns 22 of the conductor are housed. Current is supplied as before to the turns and work-piece W which in this case consists of a flat plate instead of cylindrical pipe sections. By moving the apparatus across such plate so as to leave the proper arcing space between the electrode 20 and the surface of the plate, the rapidly rotating arc produced by the magnetic field generated by the conductor turns 22 will superficially heat such surface throughout the area thus covered and to such depth as may be desired. The depth of heating will of course be controlled by the rate of movement of the apparatus across the plate. In this manner it will be seen that our apparatus may be readily adapted to superficial heat treatment of metal plates or to the heating of extended areas of such plates for any other purpose.

It will be understood that the construction of apparatus illustrated in Figs. 1 to 4 inclusive, while primarily designed for welding together the abutting ends of tubular articles such as pipe sections, may be also utilized to heat treat such articles, or in the case of the exteriorly applied apparatus illustrated in Figs. 1 and 3, for thus heat treating a solid article such as a metal shaft. In order to employ such apparatus for heat treating purposes, all that is necessary is that instead of maintaining the apparatus in a fixed location, e. g. adjacent a circular seam which is to be welded in the article or articles, such apparatus and the latter are mounted so as to permit relative movement. In other words, the rapidly rotating arc produced by the apparatus is caused to traverse longitudinally of the article being worked.

It will be noted that the coil, which carries the current, and which will ordinarily be made of copper, is completely surrounded by an iron circuit, the arc being maintained between a part of such circuit and the pipe or other article that is being worked. We have found that by thus completely enclosing the coil with such an iron circuit, much improved operative results are secured. Even where the annular electrode member is made of carbon, it will be desirable that the coil be thus encased on its remaining sides by iron which provides a magnetic circuit around the sides and back of the coil.

The term "annular," as applied to the electrode, will be understood to connote any form of electrode that provides a closed magnetic path adjacent the coil. As shown in the several forms illustrated in the drawings, it may lie either inside or outside of the coil, or in lateral relation thereto.

Other modes of applying the principle of our invention may be employed instead of the one explained, change being made as regards the means and the steps herein disclosed, provided those stated by any of the following claims or their equivalent be employed.

We therefore particularly point out and distinctly claim as our invention:

1. In an apparatus for heating a metallic work-piece by an electric arc, the combination of an annular electrode transversely split to permit relative movement of its parts and adapted to be supported with one face thereof in spaced relation to such work-piece, a conductor for electric current electrically connected at one end to said electrode and formed into a plurality of insulated turns concentric with the axis of the latter, and a second conductor adapted to be connected to said work-piece, whereby upon connecting said conductors with a suitable source of current an arc will be formed between such electrode face and work-piece and the magnetic field induced by flow of current through the turns of said first conductor will cause such arc to travel in a circular path defined by such electrode face.

2. In an apparatus for heating a metallic work-piece by an electric arc, the combination of an annular electrode transversely split into two hingedly connected parts to permit relative movement of such parts and adapted to be supported with one face thereof in spaced relation to such work-piece, a conductor for electric current electrically connected at one end to said electrode and formed into a plurality of insulated turns concentric with the axis of the latter, and a second conductor adapted to be connected to said work-piece, whereby upon connecting said conductors with a suitable source of current an arc will be formed between such electrode face and work-piece and the magnetic field induced by flow of current through the turns of said first conductor will cause such arc to travel in a circular path defined by such electrode face.

3. In apparatus for heating a metallic work-piece by an electric arc, the combination of a hollow, annular casing, one wall thereof being adapted to serve as an electrode and said casing being adapted to be supported with such wall in spaced relation to such work-piece, a conductor for electric current electrically connected at one end to said electrode wall and formed into a plurality of insulated turns contained within said casing, and a second conductor adapted to be connected to said work-piece, whereby upon connecting said conductors with a suitable source of current an arc will be formed between such electrode wall and work-piece and the magnetic field induced by flow of current through the turns of said first conductor will cause such arc to travel in a circular path defined by such electrode wall.

4. In an apparatus for heating a metallic work-piece by an electric current, the combination of a hollow annular metal casing, the inner circular wall thereof being adapted to serve as an electrode, said casing being adapted to be supported with such wall in spaced relation to such work-piece, a conductor for electric current electrically connected at one end to said electrode wall and formed into a plurality of insulated turns contained within said casing, and a second conductor adapted to be connected to said work-piece, whereby upon connecting said conductors with a suitable source of current an arc will be formed between such electrode wall and work-piece and the magnetic field induced by flow of current through the turns of said first conductor will cause such arc to travel in a circular path defined by such electrode wall.

GEORGE G. LANDIS.
NORMAN J. HOENIE.

REFERENCES CITED

The following references are of record in the file of this patent:

UNITED STATES PATENTS

| Number | Name | Date |
| --- | --- | --- |
| 510,777 | Coffin | Dec. 12, 1893 |
| 1,796,969 | Strobel | Mar. 17, 1931 |
| 1,906,496 | Stine et al. | May 2, 1933 |
| 2,280,800 | Dawson | Apr. 28, 1942 |
| 2,286,210 | Klemperer et al. | June 16, 1942 |
| 2,286,211 | Dawson et al. | June 16, 1942 |
| 2,286,212 | Gorn | June 16, 1942 |